(12) United States Patent
Sugisono et al.

(10) Patent No.: US 12,137,050 B2
(45) Date of Patent: Nov. 5, 2024

(54) TRANSFER DEVICE, COMMUNICATION SYSTEM, TRANSFER METHOD, AND TRANSFER PROGRAM

(71) Applicant: Nippon Telegraph and Telephone Corporation, Tokyo (JP)

(72) Inventors: Koji Sugisono, Musashino (JP); Shinya Kawano, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 405 days.

(21) Appl. No.: 17/631,658

(22) PCT Filed: Aug. 2, 2019

(86) PCT No.: PCT/JP2019/030596
§ 371 (c)(1),
(2) Date: Jan. 31, 2022

(87) PCT Pub. No.: WO2021/024327
PCT Pub. Date: Feb. 11, 2021

(65) Prior Publication Data
US 2022/0278931 A1 Sep. 1, 2022

(51) Int. Cl.
*H04L 45/76* (2022.01)
*H04L 45/745* (2022.01)

(52) U.S. Cl.
CPC ............ *H04L 45/76* (2022.05); *H04L 45/745* (2013.01)

(58) Field of Classification Search
CPC .............................. H04L 45/76; H04L 45/745
See application file for complete search history.

(56) References Cited

U.S. PATENT DOCUMENTS

2011/0128853 A1* 6/2011 Nishimura .............. H04L 47/11
370/235
2012/0278807 A1* 11/2012 Nakagawa .............. H04L 45/76
718/1

FOREIGN PATENT DOCUMENTS

JP 2019028869 2/2019
WO WO 2017073033 5/2017

OTHER PUBLICATIONS

Nobach et al., "Statelet-Based Efficient and Seamless NFV State Transfer," IEEE Transactions on Network and Services Management, 2017, 14(4):964-977.

* cited by examiner

*Primary Examiner* — Won Tae C Kim
(74) *Attorney, Agent, or Firm* — Fish & Richardson P.C.

(57) ABSTRACT

A transfer device includes: a storage unit that stores a management table including a transfer address, an output port, and a timer; a communication unit that has ports and transmits and receives a packet; an address retrieval unit that refers to the management table and retrieves an entry using a transmission source address of a packet, changes an output destination port of a packet in which the transmission source address is set as a transmission destination to a reception port of the packet and sets a timer of the entry when the timer of the retrieved entry is not set, and does not change a content of the entry when the timer of the retrieved entry is set; and a transfer processing unit that transfers the packet from an output port of an entry of the packet of the management table.

5 Claims, 12 Drawing Sheets

| ADDRESS | OUTPUT PORT | GUARD TIMER |
|---|---|---|
| aa:bb:cc:dd:ee:ff | 1 | off (=0) |
| bb:cc:dd:ee:ff:aa | 2 | 500ms |
| ⋮ | ⋮ | ⋮ |

121

TRANSFER DEVICE, COMMUNICATION SYSTEM, TRANSFER METHOD, AND TRANSFER PROGRAM

CROSS-REFERENCE TO RELATED APPLICATIONS

This application is a National Stage application under 35 U.S.C. § 371 of International Application No. PCT/JP2019/030596, having an International Filing Date of Aug. 2, 2019, the disclosure of which is considered part of the disclosure of this application, and is incorporated in its entirety into this application.

TECHNICAL FIELD

The present invention relates to a transfer device, a communication system, a transfer method, and a transfer program.

BACKGROUND ART

With the development of virtual machine technologies, it has become possible to rearrange software that migrates data to other servers without stopping the software. The rearrangement of software is performed during the maintenance or load distribution of a server in which the software at a migration source is activated.

When data used by software at a migration source is migrated to software at a rearrangement destination, the transfer destination of a data flow transmitted to the software is required to be changed to a migration destination. In view of this, there has been conventionally proposed a method for changing a transfer path without causing the occurrence of a packet loss (see, for example, Non Patent Literature 1).

CITATION LIST

Non Patent Literature

[NPL 1] L. Nobach, I. Rimac, V. Hilt and D. Hausheer, "Statelet-Based Efficient and Seamless NFV State Transfer", in IEEE Transactions on Network and Service Management, vol. 14, no. 4, pp. 964-977, December 2017.

SUMMARY OF THE INVENTION

Technical Problem

In the method described in Non Patent Literature 1, a SDN (Software Defined Network) technology is used as a data transfer network technology, and the transfer destination of a SDN switch is changed to a new one at timing at which the migration of software data is completed. Further, in the method described in Non Patent Literature 1, software at a rearrangement destination performs control to harmonize the order of packet processing with data update timing to process a packet with correct data.

Here, the control of a packet transfer device is performed by a centralized control device (SDN controller) in a SDN. When performing a path change, the SDN controller calculates a path after the change and sets the output destination of a packet on the basis of a result. Then, the SDN controller generates a message for the path change and transmits the generated message to a switch.

However, the processing causes a large load on the SDN controller. Particularly, in a network such as a data center having a large number of switches or servers, it takes time to generate a message or calculate a path due to an increase in a load and becomes difficult to deliver a message to all devices in the network at the same timing. This results in a deviation in the setting timing of a switch and the occurrence of route flapping or a packet drop.

The present invention has been made in view of the above and has an object of providing a transfer device, a communication system, a transfer method, and a transfer program capable of reducing a load by a higher level controller.

Means for Solving the Problem

In order to solve the above problem and achieve the object, a transfer device according to the present invention includes: a storage unit that stores a management table having an entry including a transfer address, an output port, and a timer; a communication unit that has a plurality of ports and transmits and receives a packet; a retrieval unit that refers to the management table and retrieves an entry using a transmission source address of a packet as a key when receiving the packet, changes an output destination port of a packet in which the transmission source address is set as a transmission destination to a reception port of the packet and sets a timer of the entry with respect to the entry when the timer of the retrieved entry is not set, and does not change a content of the entry when the timer of the retrieved entry is set; and a transfer processing unit that transfers the packet from an output port of an entry of the packet of the management table.

Further, a communication system according to the present invention is a communication system having a first physical device that operates first software at a data migration source, a second physical device that operates second software at a data migration destination, and a transfer device that transfers a packet, wherein the first software synchronizes data and a transfer address used by the first software with the second software, the second software broadcasts a packet in which an address taken over from the first software is attached as a transmission source address to a data plane network at designated timing, and the transfer device has a storage unit that stores a management table having an entry including a transfer address, an output port, and a timer, a communication unit that has a plurality of ports and transmits and receives a packet, a retrieval unit that refers to the management table and retrieves an entry using a transmission source address of a packet as a key when receiving the packet, changes an output destination port of a packet in which the transmission source address is set as a transmission destination to a reception port of the packet and sets a timer of the entry with respect to the entry when the timer of the retrieved entry is not set, and does not change a content of the entry when the timer of the retrieved entry is set, and a transfer processing unit that transfers the packet from an output port of an entry of the packet of the management table.

Further, a transfer method according to the present invention is a transfer method performed by a transfer device, the transfer device having a storage unit that stores a management table having an entry including a transfer address, an output port, and a timer and a communication unit that has a plurality of ports and transmits and receives a packet, the transfer method including: a step of referring to the management table and retrieving an entry using a transmission source address of a packet as a key when receiving the packet; a step of changing an output destination port of a packet in which the transmission source address is set as a transmission destination to a reception port of the packet and setting a timer of the entry with respect to the entry when the timer of the retrieved entry is not set; and a step of transferring the packet from an output port of an entry of the packet of the management table when the timer of the retrieved entry is set.

Further, a transfer program according to the present invention causes a computer to perform: a step of referring to a management table having an entry including a transfer address, an output port, and a timer and retrieving an entry using a transmission source address of a packet as a key when receiving the packet; a step of changing an output destination port of a packet in which the transmission source address is set as a transmission destination to a reception port of the packet and setting a timer of the entry with respect to the entry when the timer of the retrieved entry is not set; and a step of transferring the packet from an output port of an entry of the packet of the management table when the timer of the retrieved entry is set.

Effects of the Invention

According to the present invention, a load by a higher level controller can be reduced.

DESCRIPTION OF EMBODIMENTS

Hereinafter, an embodiment of a transfer device, a communication system, a transfer method, and a transfer program according to the present application will be described in detail on the basis of the drawings. Further, the present invention is not limited to the following embodiment.

Embodiment

First, the embodiment will be described. The present embodiment relates to a data migration method between VNFs (Virtual Network Functions) in which software each activated in a different server is installed and a path change method of a data plane network of a traffic flow associated with data. The present embodiment relates to a data migration method and a path change method in a case in which it is desired that a VNF be activated on another server for the maintenance or load balancing of a server. Note that a VNF is software such as a NAPT (Network Address Port Translation), an IDS (Intrusion Detection System), and a router for performing packet processing and operable on an arbitrary server in which an operating environment exists.

[Configuration of Communication System]

Figure 1:
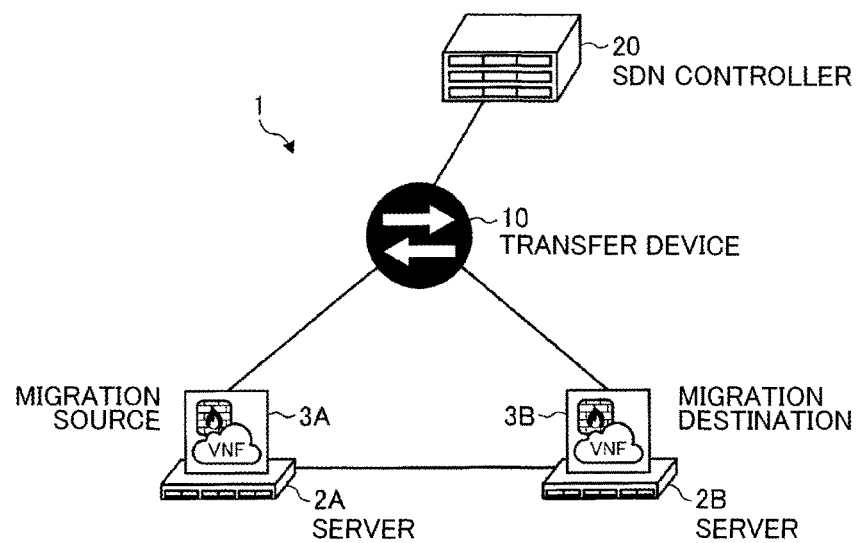
FIG. 1 is a diagram showing an example of the configuration of a communication system according to an embodiment.

FIG. 1 is a diagram showing an example of the configuration of a communication system according to the embodiment. As shown in FIG. 1, a communication system 1 according to the embodiment has a SDN controller 20, a transfer device 10, a server 2A (first physical device), and a server 2B (second physical device). Note that the numbers of the transfer device 10 and the servers 2A and 2B are given as an example and are not limited to the numbers shown in FIG. 1.

The SDN controller 20 is a centralized control device provided above the transfer device 10. When performing a path change, the SDN controller 20 calculates a path after the change and sets the output destination of a packet on the basis of a calculation result.

The server 2A is a physical device that operates a VNF 3A (first software). The server 2B is a physical device that operates a VNF 3B (second software). In the example of FIG. 1, the VNF 3A is a data migration source VNF, and the VNF 3B is a data migration destination VNF. When instructed by the SDN controller 20 to change a path, the VNF 3A synchronizes data and a transfer address used by the VNF 3A with the VNF 3B and performs data migration. The migration destination VNF 3B broadcasts a packet in which an address taken over from the VNF 3A is attached as a transmission source address to a data plane network at designated timing.

The transfer device 10 receives a packet and transfers the received packet to a transmission destination address. The transfer device 10 is, for example, a SDN switch. When changing a path, the transfer device 10 changes an output port corresponding to a MAC address that is a path change target to a change destination output port to change the path of a data plane network.

The transfer device 10 receives a broadcast from the migration destination VNF 3B and learns a MAC address to change a change destination output port to an output port corresponding to the server 2B in which the migration destination VNF 3B is activated. After that, when receiving a packet from the migration source VNF 3A, the transfer device 10 transfers the packet as it is without learning the MAC address of the packet to prevent the occurrence of route flapping or a packet drop.

In order to operate the VNF 3B in the migration destination server 2B, the following processing is performed. First, the migration destination VNF 3B is activated on the server 2B. Then, the migration source VNF 3A migrates packet processing data that has been used to the migration destination VNF 3B. Note that packet processing data will be called a state in the following description. A state corresponds to, for example, the flow allocation address of a NAPT or the flow behavior information of an IDS. Subsequently, the transfer device 10 sets the path of the data plane network so that a flow passes through the migration destination VNF 3B.

[Configuration of Transfer Device]

Figure 2:
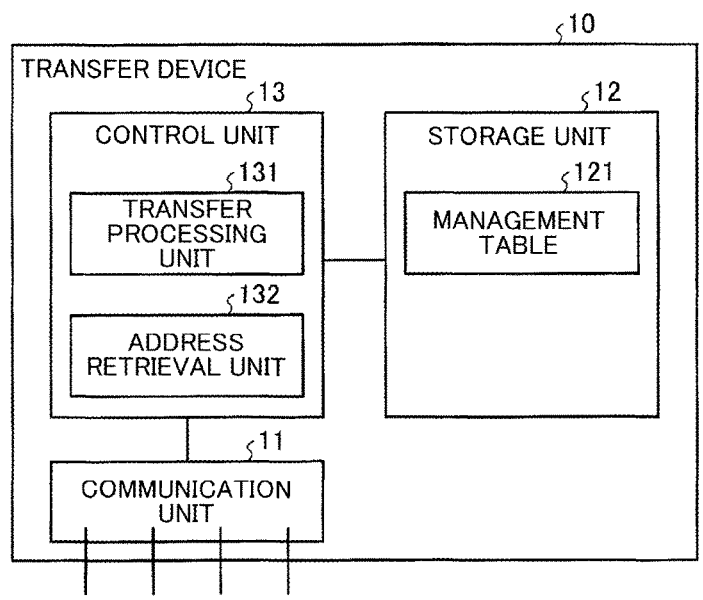
FIG. 2 is a block diagram showing an example of the configuration of a transfer device shown in FIG. 1.

FIG. 2 is a block diagram showing an example of the configuration of the transfer device 10 shown in FIG. 1. As shown in FIG. 2, the transfer device 10 has a communication unit 11, a storage unit 12, and a control unit 13.

The communication unit 11 is a communication interface that transmits and receives various information to and from other devices connected via a network or the like. The communication unit 11 performs communication between other devices and the control unit 13 (that will be described later) via an electric communication line such as a LAN (Local Area Network) and the Internet. The communication unit 11 has a plurality of ports and transmits and receives a packet. Each of the ports is connected to a communication destination device via a cable that transmits an electric signal.

The storage unit 12 is realized by a semiconductor memory element such as a RAM (Random Access Memory) and a flash memory. In the storage unit 12, a processing program for operating the transfer device 10, data used during the execution of the processing program, or the like is stored. The storage unit 12 stores a management table 121. The management table 121 includes information for managing packet transfer.

Figures 3, 4:
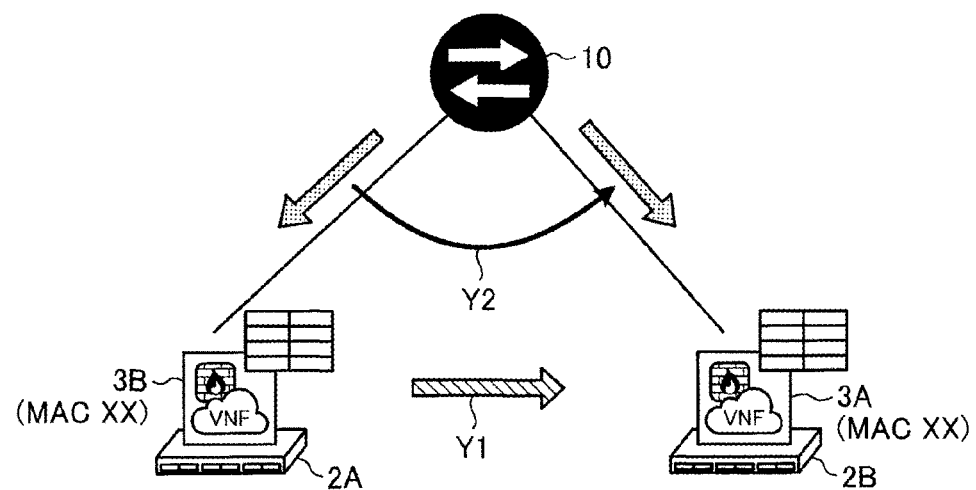
FIG. 3 is a diagram showing an example of the data configuration of a management table shown in FIG. 2.
FIG. 4 is a diagram describing the flow of processing relating to a path change associated with data migration between VNFs.

FIG. 3 is a diagram showing an example of the data configuration of the management table 121 shown in FIG. 2. As shown in FIG. 3, the management table 121 has entries each including a transfer address (address), an output port number, and a guard timer. The timer value of a guard timer (timer) is set when the transfer device 10 receives a broadcast from the migration destination VNF 3B and changes a port with the learning of a MAC address. In a guard timer column, "off (=0)" is registered when a timer is not set, while a timer value is registered when a timer is set.

For example, in the entry of the first line, the address "aa:bb:cc:dd:ee:ff", the output port "1", and the guard timer "off (=0)" are registered. In the entry of the second line, the address "bb:cc:dd:ee:ff:aa", the output port "2", and the guard timer "500 ms" are registered. Since the timer value of a guard timer has been set with respect to the entry of the second line, the learning of a MAC address and a port change through receiving a broadcast are performed by the transfer device 10 for a VNF corresponding to the entry.

The control unit 13 controls the whole transfer device 10. The control unit 13 is, for example, an electronic circuit such as a CPU (Central Processing Unit) or an integrated circuit such as an ASIC (Application Specific Integrated Circuit) and a FPGA (Field Programmable Gate Array). Further, the control unit 13 has an internal memory for storing a program defining various processing procedures or control data and performs various processing using the internal memory. Further, the control unit 13 functions as various processing units when various programs are operated. The control unit 13 has a transfer processing unit 131 and an address retrieval unit 132 (retrieval unit).

The transfer processing unit 131 transfers a packet from an output port corresponding to the transmission destination address of the packet.

The address retrieval unit 132 refers to the management table 121 and retrieves an entry using the transmission source address of a received packet as a key when receiving the packet. When the guard timer of a retrieved entry is not set, the address retrieval unit 132 changes the output destination port of a packet in which a transmission source address is set as a transmission destination to the reception port of the packet and sets the guard timer of the entry with respect to the entry. This processing is performed when a broadcast from the migration destination VNF 3B is received. In this case, the address retrieval unit 132 changes a port with the learning of a MAC address and sets a timer value.

On the other hand, the address retrieval unit 132 does not change the content of an entry and transfers a packet from an output port registered in the entry of the packet when the guard timer of the retrieved entry is set. This processing is performed, for example, when a packet transferred from the migration source VNF 3A is received before a path change. In this case, the address retrieval unit 132 transfers the packet without learning a MAC address.

[Flow of Processing]

Subsequently, the flow of processing relating to a path change associated with data migration between the VNFs 3A and 3B will be described. FIGS. 4 to 8 are diagrams for describing the flow of the processing relating to the path change associated with the data migration between the VNFs 3A and 3B. In FIGS. 4 to 8, the description of the SDN controller 20 is omitted.

First, a situation assuming path change processing will be specifically described with reference to FIG. 4. As shown in FIG. 4, the VNF 3A operating on the server 2A migrates the state data of the VNF 3A to the VNF 3B operating on the server 2B (see an arrow Y1). After the migration of the state is completed, the transfer device 10 changes the transfer destination of a data packet from the server 2A to the server 2B (see an arrow Y2). Note that "MAX XX" is set in both the MAD addresses of the VNFs 3A and 3B operating on the servers 2A and 2B, respectively.

Figure 5:
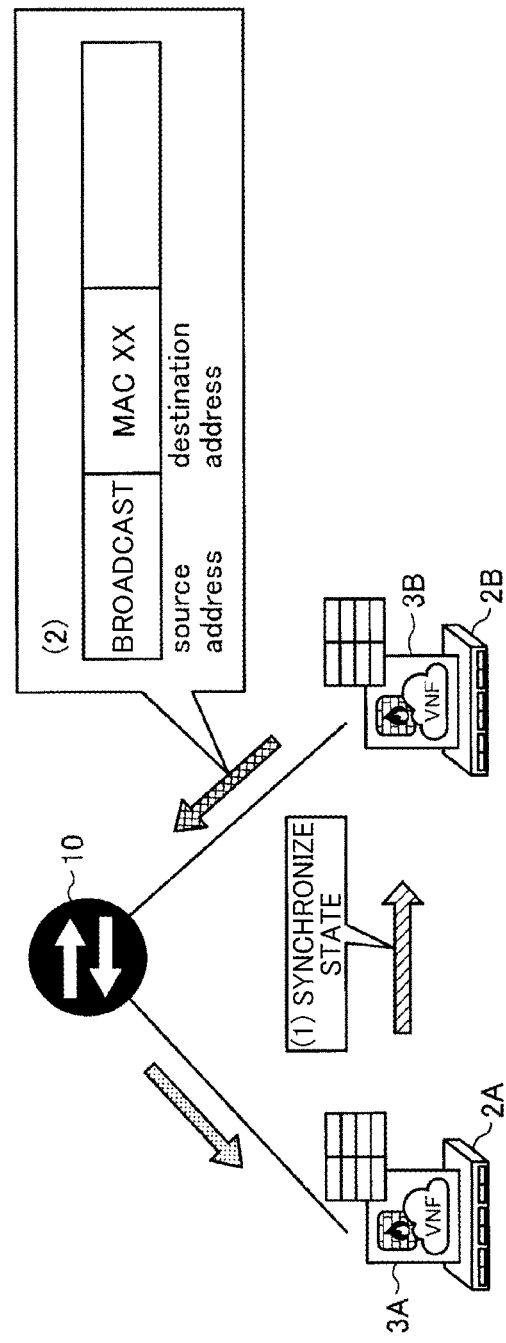
FIG. 5 is a diagram describing the flow of processing relating to a path change associated with data migration between the VNFs.

Subsequently, the flow of the path change processing will be described with reference to FIGS. 5 to 8. As shown in FIG. 5, the server 2A synchronizes a state with the server 2B (see (1) in FIG. 5) and notifies the server 2B of the fact that data transmission is to be completed soon when an untransmitted state data amount falls below a threshold.

When receiving the notification, the server 2B broadcasts a transfer destination change packet in which the MAC address of the own device is attached to the transmission source (source address) column of a header in a subnet so that the transfer device 10 is caused to operate to change the transfer destination of a data packet to the VNF 3B of the server 2B (see (2) in FIG. 5).

Figure 6:
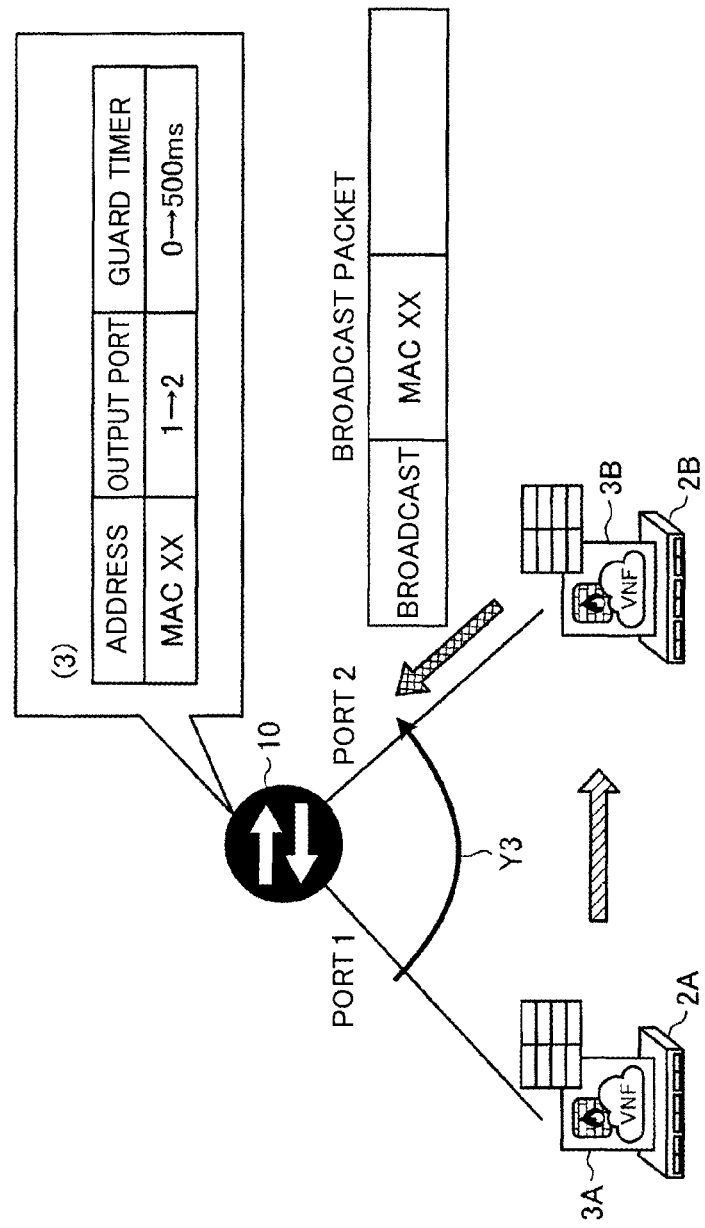
FIG. 6 is a diagram describing the flow of processing relating to a path change associated with data migration between the VNFs.

Then, the transfer device 10 checks the transmission source address of the broadcast packet when receiving the broadcast packet as shown in FIG. 6. The transfer device 10 refers to the management table 121 and retrieves an entry using the transmission source address of the broadcast packet as a key. Then, the transfer device 10 checks the value of a guard timer in the retrieved entry.

In this case, the transfer device 10 performs MAC learning processing since the value of the guard time is zero and the guard timer is not set. As the MAC learning processing, the transfer device 10 changes an output port destined to the address of the entry from a port 1 corresponding to the server 2A to a port 2 corresponding to the server 2B with respect to the retrieved entry (see an arrow Y3 in FIG. 6 and (3) in FIG. 6). Then, the transfer device 10 sets a designated guard time (500 ms) in a guard timer column (see (3) in FIG. 6). The transfer device 10 broadcasts the packet from the other port.

Figure 7:
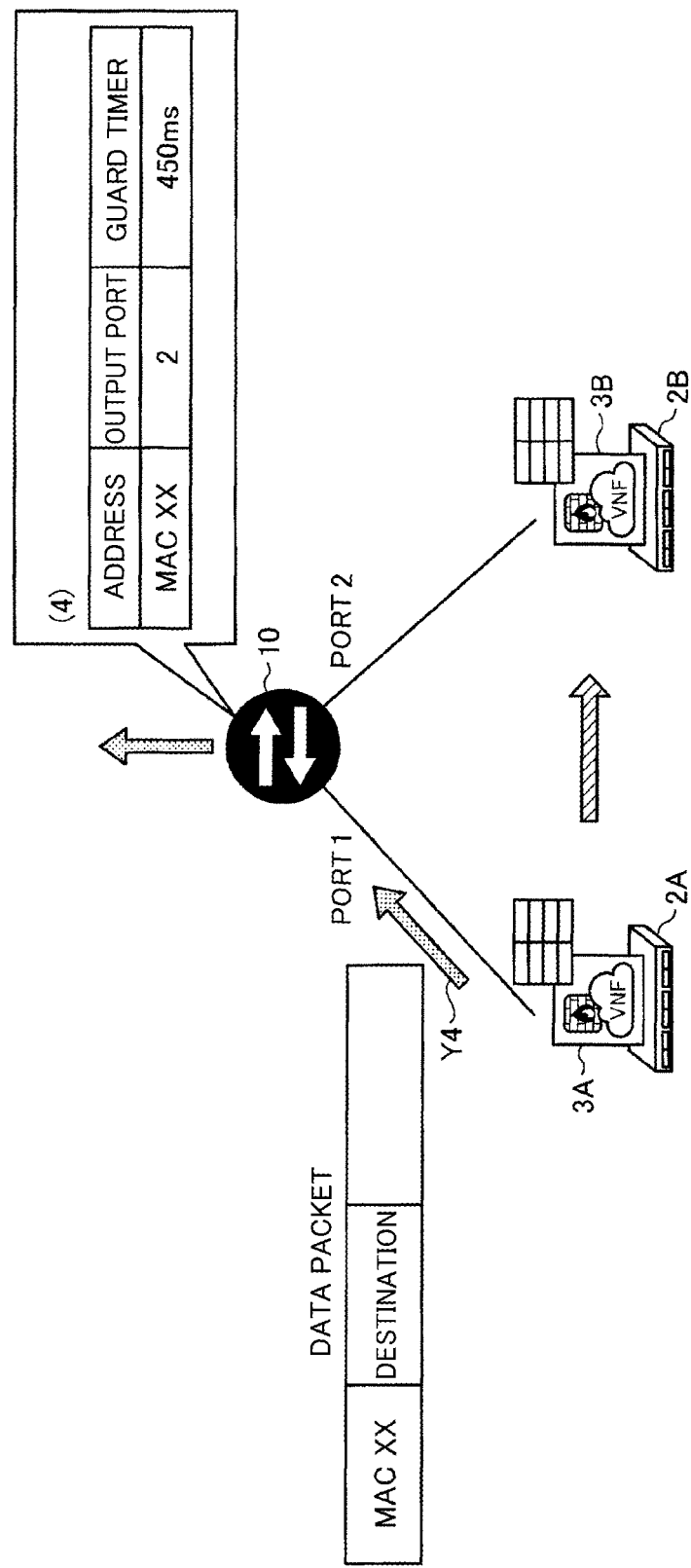
FIG. 7 is a diagram describing the flow of processing relating to a path change associated with data migration between the VNFs.

Further, a case in which a packet reaches the server 2A before a path change and is transferred to the transfer device 10 again after being processed by the VNF 3A will be described with reference to FIG. 7 (see an arrow Y4 in FIG. 7). In this case, the transfer device 10 checks the transmission source address of the packet, refers to the management table 121, and retrieves an entry using the transmission source address of the received packed as a key. In this case, the transfer device 10 transfers the packet to a transmission destination without performing MAC learning since a value (450 ms) is set in a guard timer (see (4) in FIG. 7).

Subsequently, a case in which the VNF 3A operating on the server 2A receives a packet in which the same address as a MAC address set in the own device is recorded in a header from the server 2B will be described with reference to FIG. 8.

Figure 8:
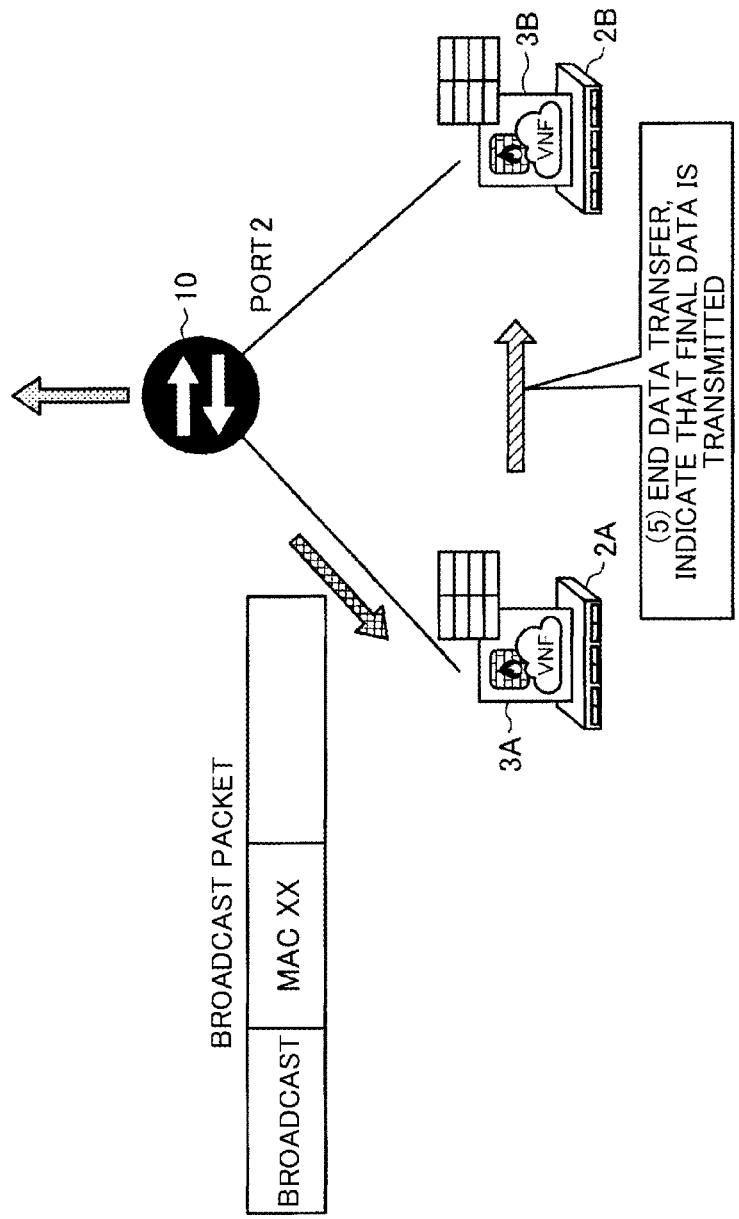
FIG. 8 is a diagram describing the flow of processing relating to a path change associated with data migration between the VNFs.

In this case, the VNF 3A stops the transmission of data from the VNF 3A to the VNF 3B and notifies the VNF 3B of a complete notification indicating that final data is transmitted and the transmission of a state is completed (see (5) in FIG. 8). When receiving the complete notification from the VNF 3A operating on the server 2A, the VNF 3B records the data, takes over processing that has been performed by the VNF 3A operating on the server 2A, and ends data migration processing.

[Processing Procedure of Path Change Processing Associated with Data Migration]

Figure 9:
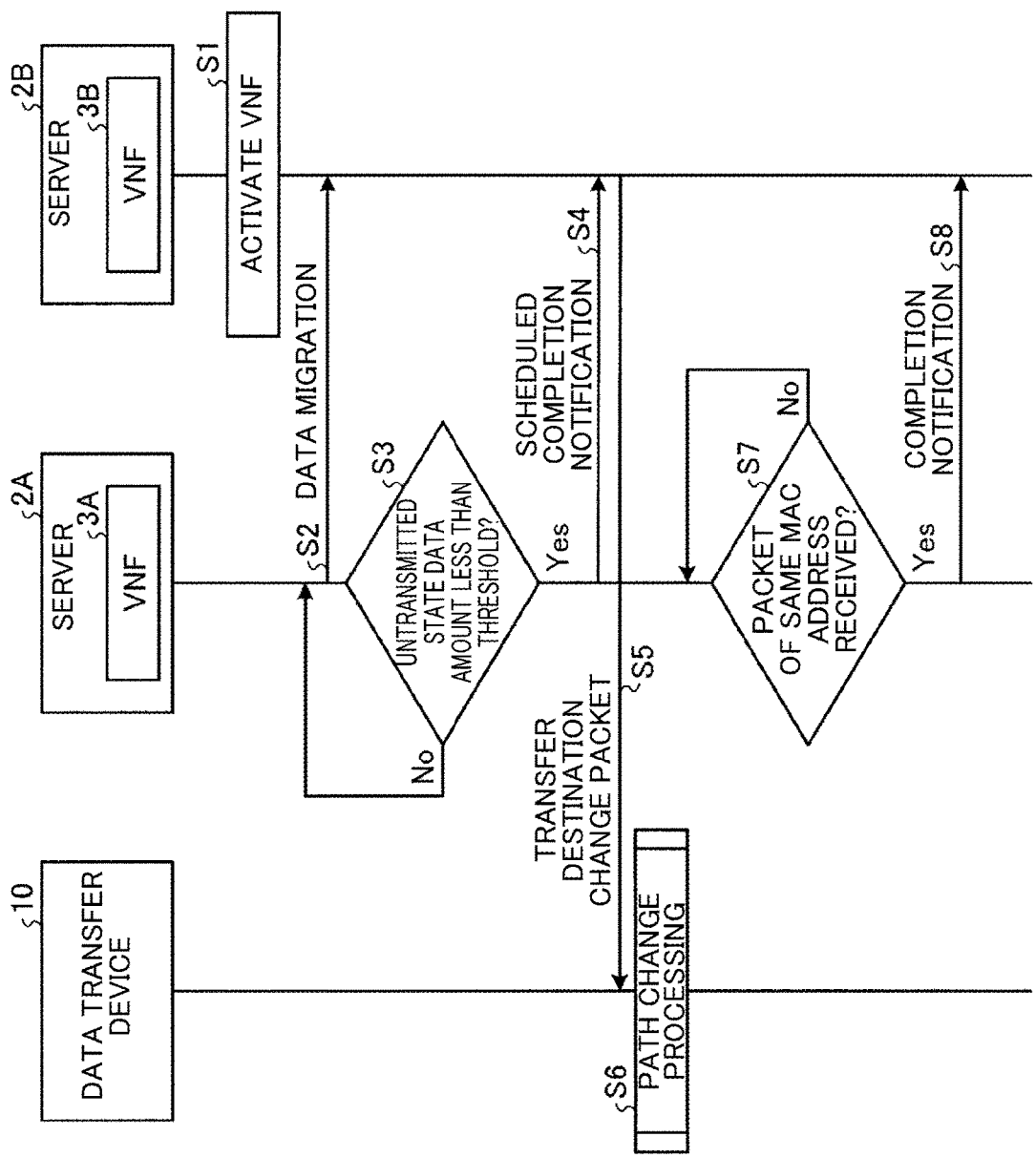
FIG. 9 is a sequence diagram showing a processing procedure relating to a path change associated with data migration between the VNFs in the communication system shown in FIG. 1.

FIG. 9 is a sequence diagram showing a processing procedure relating to a path change associated with data migration between the VNFs 3A and 3B in the communication system 1 shown in FIG. 1.

As shown in FIG. 9, the server 2B activates the VNF 3B serving as a data migration destination (step S1). Then, between the VNF 3A and the VNF 3B, data and a transfer address used by the VNF 3A is synchronized and data migration from the VNF 3A to the VNF 3B is performed (step S2). The server 2A determines whether an untransmitted state data amount is less than a threshold (step S3). When the untransmitted state data amount is not less than the threshold (step S3: No), the processing proceeds to step S2 to continue the data migration between the VNFs 3A and 3B.

On the other hand, the server 2A transmits a scheduled completion notification indicating that data transmission is to be completed soon to the server 2B (step S4) when the untransmitted state data amount is less than the threshold (step S3: Yes).

Subsequently, the server 2B broadcasts a transfer destination change packet in which a MAC address taken over from the VNF 3A is attached to a header as a transmission source address to a data plane network so that the transfer device 10 is caused to operate to change the transfer destination of a data packet to the VNF 3B of the server 2B (step S5). When receiving the packet, the transfer device 10 performs path change processing in the data plane network (step S6).

The server 2A determines whether a packet in which the same MAC address as an address set in the VNF 3A is attached to a header has been received (step S7). When the packet in which the same MAC address as the address set in the VNF 3A is attached to the header has not been received (step S7: No), the server 2A performs the determination processing of step S10.

When the packet in which the same MAC address as the address set in the VNF 3A is attached to the header has been received (step S7: Yes), the server 2A stops the transmission of the data to the VNF 3B and notifies the server 2B of a completion notification indicating that the transmission of the data has been completed (step S8).

[Processing Procedure of Path Change Processing]

Figure 10:
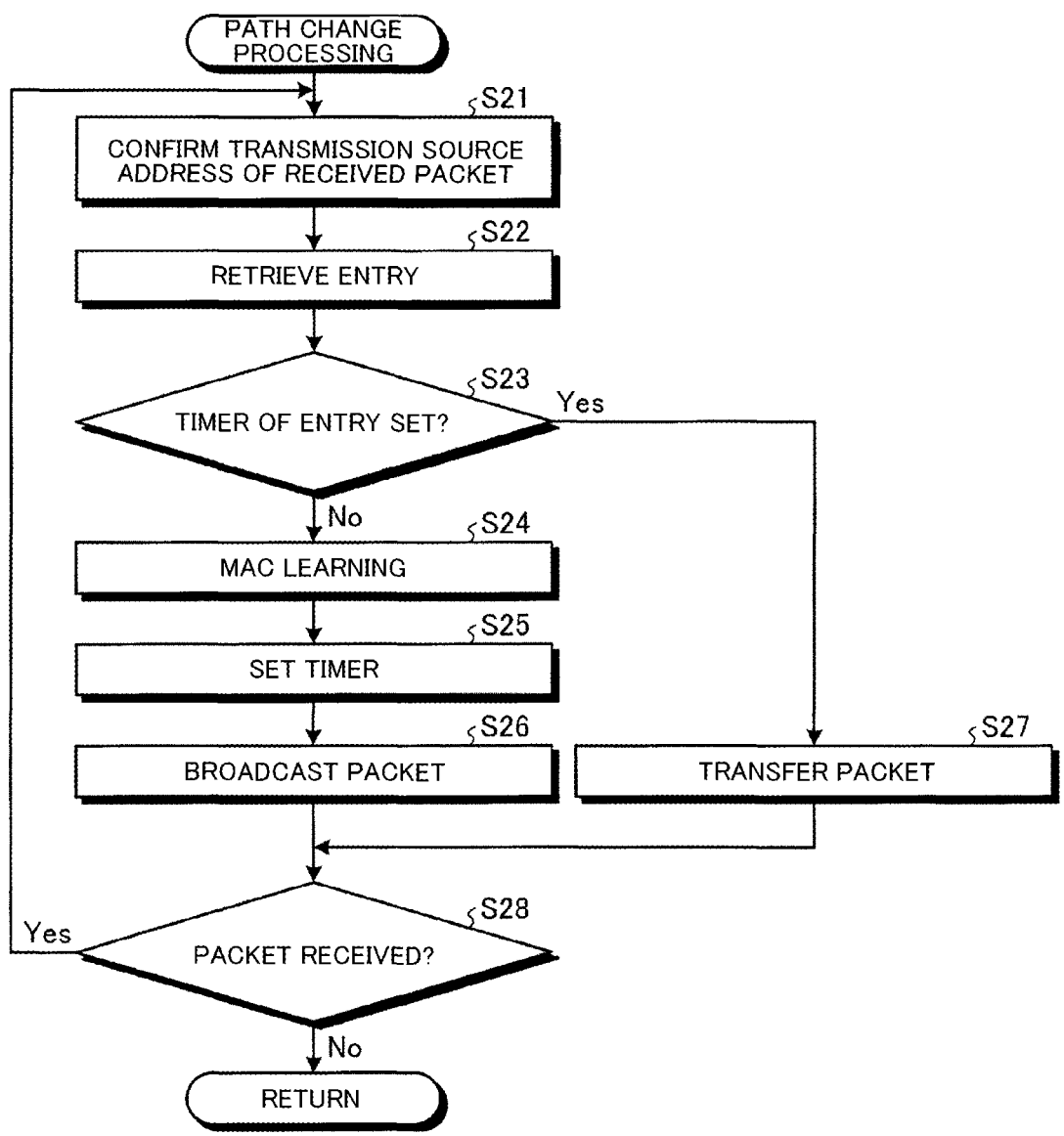
FIG. 10 is a flowchart showing the processing procedure of path change processing shown in FIG. 9.

Next, the path change processing (step S9) will be described. FIG. 10 is a flowchart showing the processing procedure of the path change processing shown in FIG. 9.

As shown in FIG. 10, the address retrieval unit 132 confirms the transmission source address of a received packet in the transfer device 10 (step S21). The address retrieval unit 132 refers to the management table 121 and retrieves an entry using the transmission source address of the received packet as a key (step S22). The address retrieval unit 132 determines whether the guard timer of the retrieved entry is set (step S23).

When the guard timer of the retrieved entry is not set (step S23: No), the address retrieval unit 132 performs MAC learning to change the output destination port of a packet in which the transmission source address is set as a transmission destination to the reception port of the packet with respect to the entry (step S24). Then, the address retrieval unit 132 sets the guard timer of the entry (step S25). The transfer processing unit 131 broadcasts the reached packet (step S26).

On the other hand, the address retrieval unit 132 does not perform the MAC learning when the guard timer of the retrieved entry is set (step S23: Yes), and the packet is transferred to a transmission destination from the transfer processing unit 131 (step S27).

Then, the transfer device 10 returns to step S21 when receiving the packet (step S28: Yes) and performs entry retrieval processing with respect to the packet. On the other hand, the transfer device 10 ends the processing when not receiving the packet (step S28: No).

Effect of Embodiment

Figure 11:
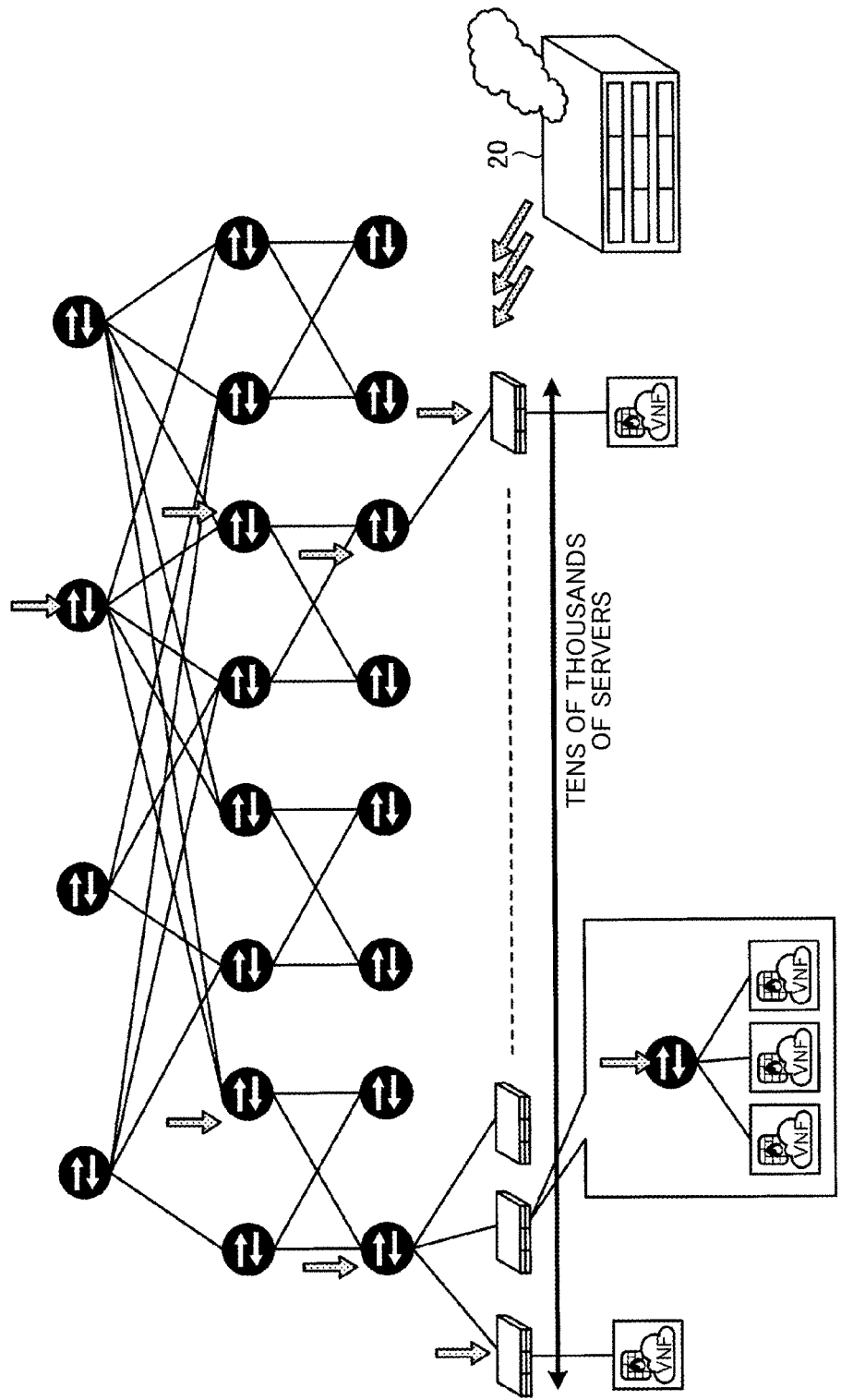
FIG. 11 is a diagram exemplifying path calculation targets by a SDN controller.

FIG. 11 is a diagram exemplifying path calculation targets of a SDN controller. When performing a path change, a SDN controller conventionally calculates a path after the change, sets a packet output destination on the basis of a result, and generates and transmits a message for the path change to a switch. Here, the number of messages corresponds to a number obtained by multiplying path change portions by the numbers of switches and virtual switches requiring a flow rule. In addition, in a network having a large number of switches and servers, a SDN controller is required to calculate the shortest path problem (Dijkstra) of tens of thousands of nodes in some cases. As a result, a load on the SDN controller 20 becomes enormous (see FIG. 11).

Figure 12:
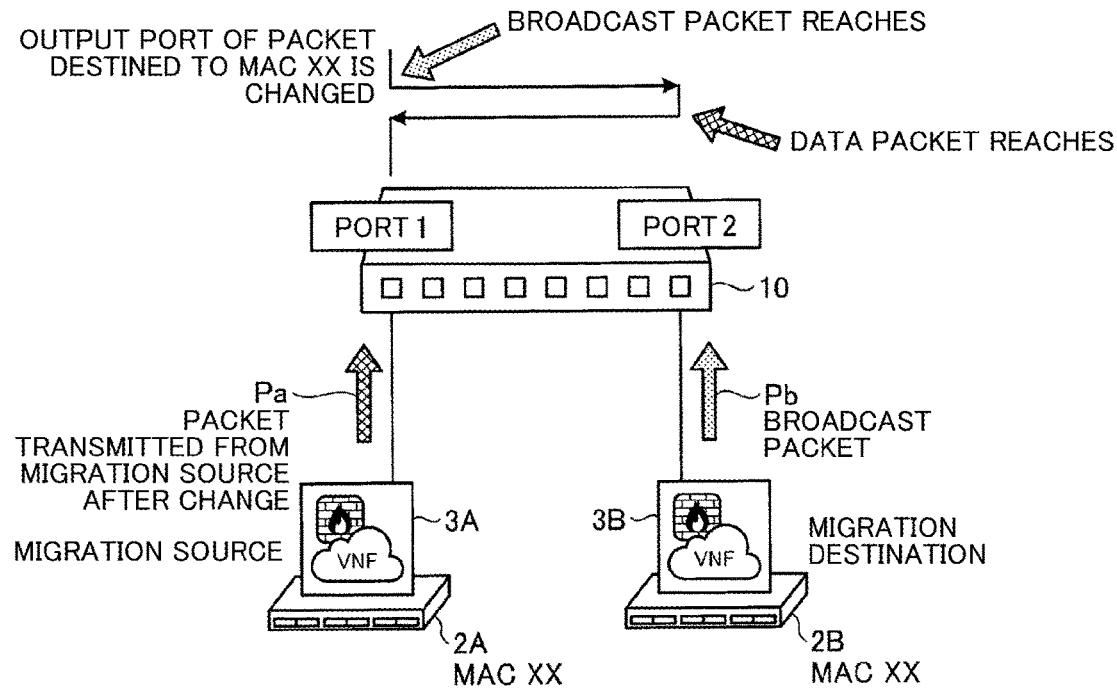
FIG. 12 is a diagram describing a conventional packet path change.

FIG. 12 is a diagram describing a conventional packet path change. As shown in FIG. 12, a transfer device 10P conventionally performs MAC learning for a broadcast packet Pb transmitted from a migration destination VNF 3B and changes the output destination port of a MAC address from a port 1 corresponding to a VNF 3A to a port 2 corresponding to the VNF 3B to perform a path change.

Therefore, when a packet Pa transmitted from the migration source VNF 3A reaches the transfer device 10P after a path change, the MAC learning is performed again for the packet and the output destination port of the MAC address is changed from the port 2 corresponding to the VNF 3B to the port 1 corresponding to the VNF 3A. As described above, route flapping in which path information is frequently changed in a short period of time has conventionally occurred. As a result, there has been a problem that a data packet is not transferred to the VNF 3B that is a correct transmission destination.

Figure 13:
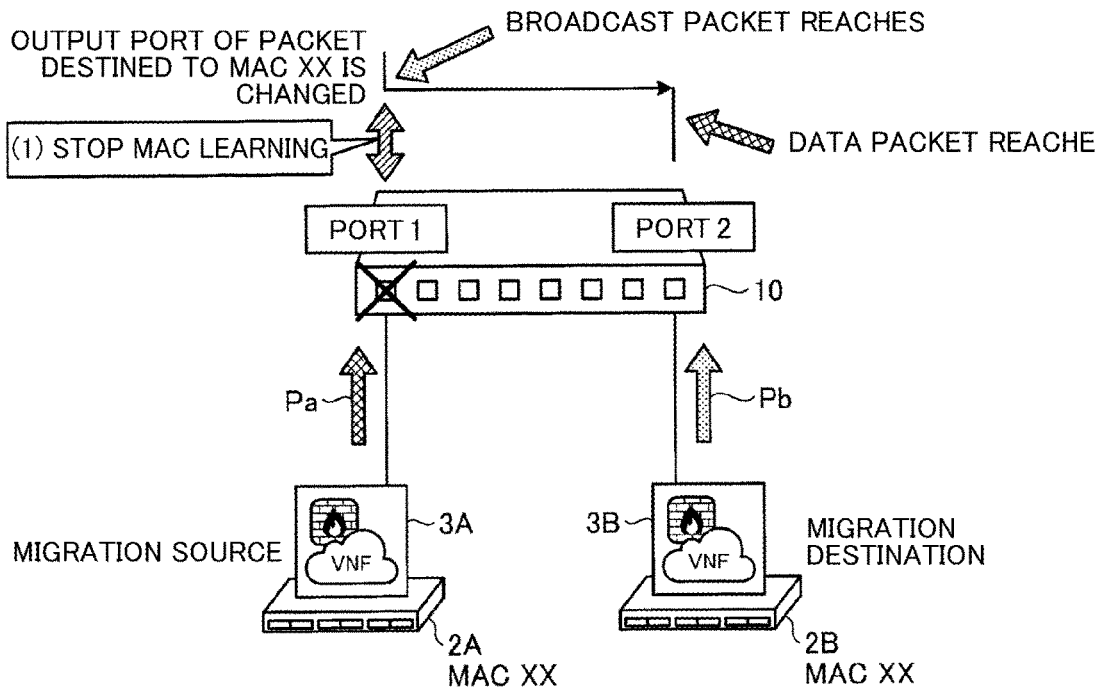
FIG. 13 is a diagram describing a path change for a packet in the embodiment.
Figure 14:
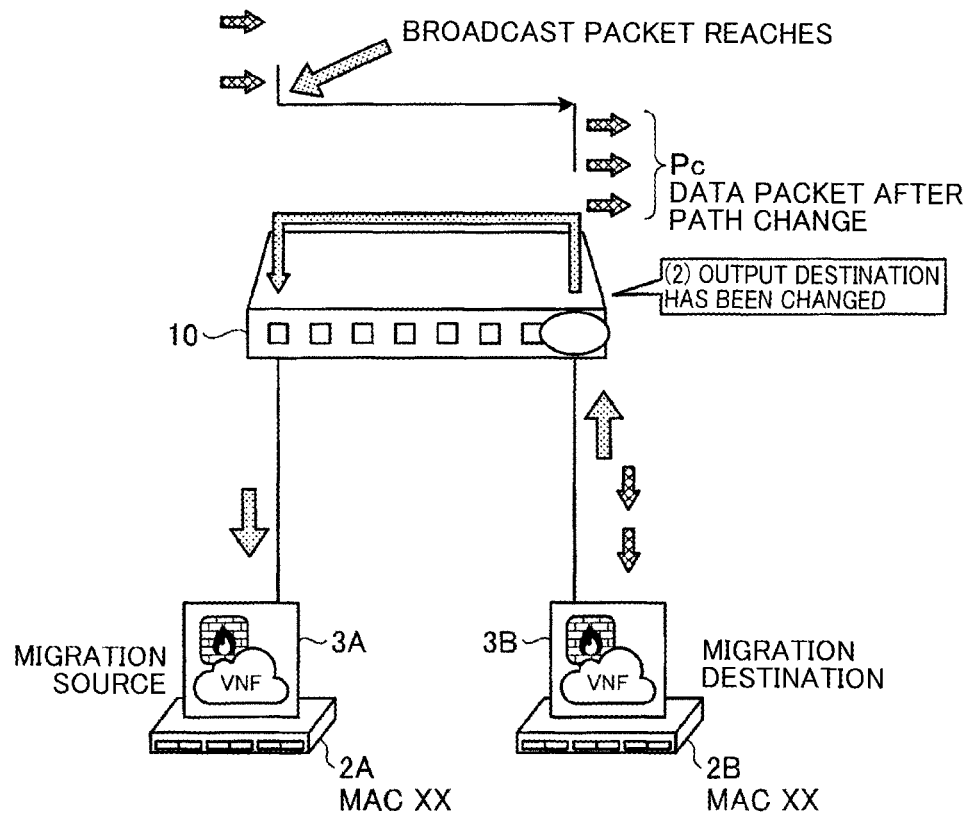
FIG. 14 is a diagram describing the path change for the packet in the embodiment.
Figure 15:
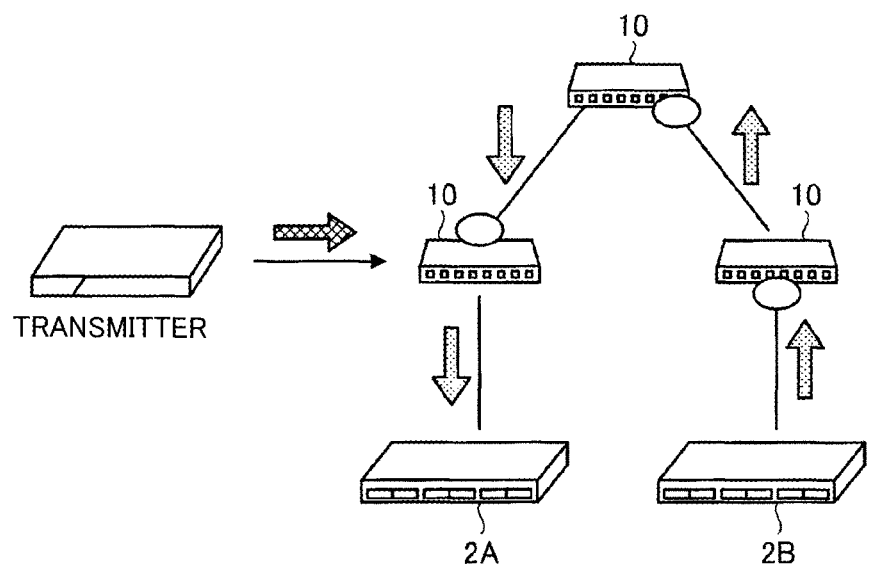
FIG. 15 is a diagram describing the path change for the packet in the embodiment.

FIGS. 13 to 15 are diagrams describing a path change for a packet in the embodiment. In the present embodiment, the transfer device 10 stops MAC learning for a MAC address for a certain period of time after receiving a broadcast packet Pb from the migration destination VNF 3B and performing the MAC learning (see (1) in FIG. 13).

As a result, the transfer device 10 according to the embodiment can reduce the occurrence of route flapping. Further, since an output destination port has been changed to the migration destination VNF 3B in the transfer device 10 (see (2) in FIG. 14), a data packet Pc after a path change is properly transferred to the migration destination VNF 3B without being transferred to the migration source VNF 3A. As a result, the transfer device 10 can also reduce the occurrence of a packet drop. Further, since the transfer device 10 performs a path change after receiving the broad packet Pb from the migration destination VNF 3B, the SDN controller 20 is not required to transmit a message for the path change to the transfer device 10.

Then, when receiving a packet in which the same MAC address as a MAC address set in the VNF 3A is attached to a header during the transmission of data to the second software, the migration source VNF 3A ends state transmission and makes state contents agree with each other between the VNFs 3A and 3B. Then, the VNF 3A transmits a transmission complete notification indicating the transmission complete of a state to the migration destination VNF 3B. Thus, the VNF 3B operating on the server 2B can properly take over processing performed by the VNF 3A operating on the server 2A.

As described above, the occurrence of route flapping or a packet drop is reduced according to the present embodiment. In addition, the SDN controller 20 is not required to transmit a message for a patch change to the transfer device 10 when performing the path change in the present embodiment. Accordingly, message transmission processing for a path change can be omitted in the SDN controller 20 according to the present embodiment. Therefore, a load on the SDN controller 20 can be reduced.

[System Configuration of Embodiment]

The respective constituting elements of the transfer device 10 and the serves 2A and 2B shown in FIG. 1 are functionally conceptual and are not necessarily required to be physically configured as shown in the diagram. That is, the specific modes of separation and integration of the functions of the transfer device 10 and the servers 2A and 2B are not limited to the illustrated modes, and all or a part of the functions can be configured in a functionally or physically separated or integrated manner in an arbitrary unit according to various load, use conditions, or the like.

Further, all or an arbitrary part of the respective processing performed by the transfer device 10 and the servers 2A and 2B may be realized by the CPU and a program analyzed and performed by the CPU. Further, the respective processing performed by the transfer device 10 and the servers 2A and 2B may be realized as hardware based on wired logic.

Further, among the respective processing described in the embodiment, all or a part of the processing described as being automatically performed can be manually performed.

Alternatively, all or a part of the processing described as being manually performed can be automatically performed according to a known method. Besides, information including the processing procedures, the control procedures, the specific names, and the various data or parameters described above and shown in the diagrams can be appropriately changed unless otherwise specifically noted.

[Program]

Figure 16:
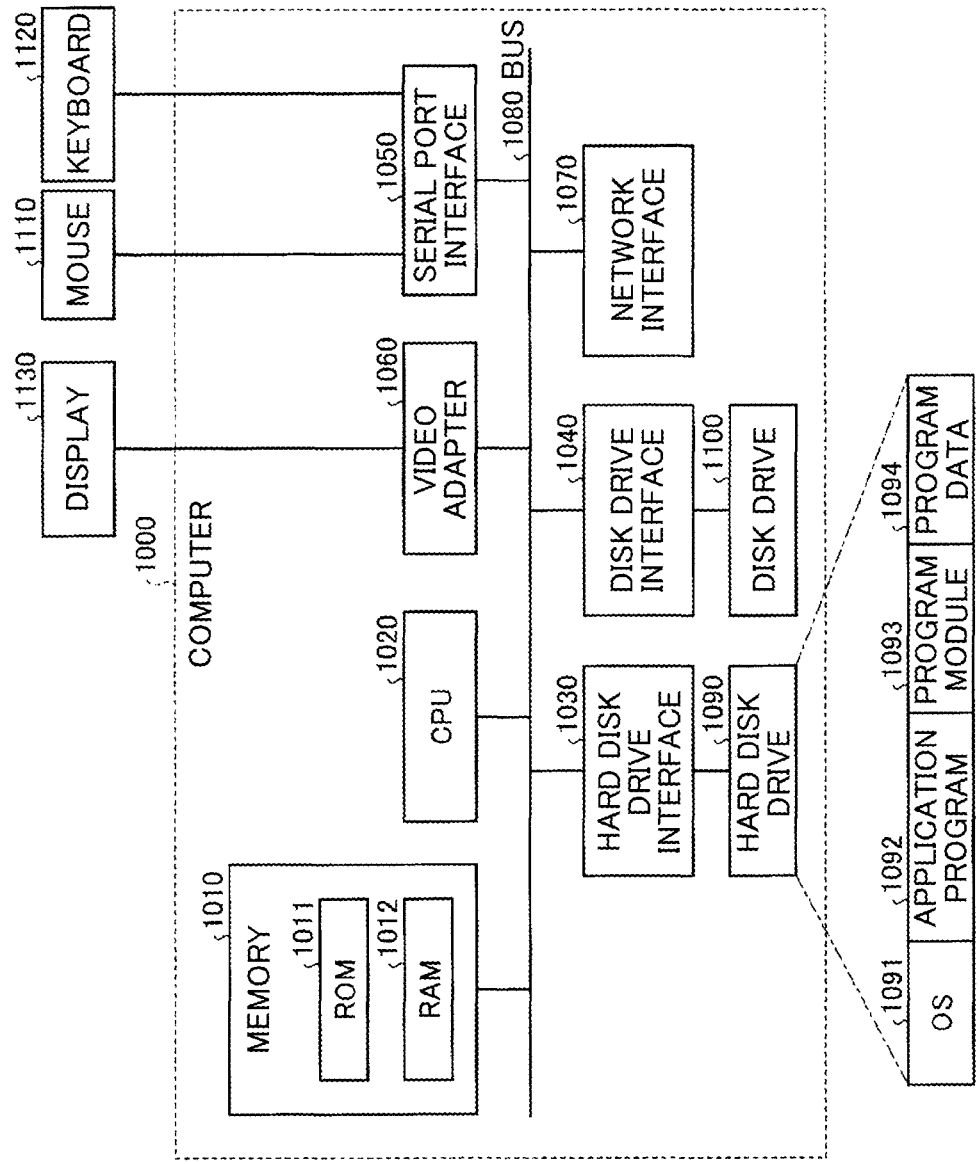
FIG. 16 is a diagram showing an example of a computer in which a transfer device and a server are realized when a program is performed.

FIG. 16 is a diagram showing an example of a computer in which the transfer device 10 and the servers 2A and 2B are realized when a program is performed. A computer 1000 has, for example, a memory 1010 and a CPU 1020. Further, the computer 1000 has a hard disk drive interface 1030, a disk drive interface 1040, a serial port interface 1050, a video adapter 1060, and a network interface 1070. These respective units are connected to each other by a bus 1080.

The memory 1010 includes a ROM 1011 and a RAM 1012. The ROM 1011 stores, for example, a boot program such as a BIOS (Basic Input Output System). The hard disk drive interface 1030 is connected to a hard disk drive 1090. The disk drive interface 1040 is connected to a disk drive 1100. For example, a detachable storage medium such as a magnetic disk and an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS (Operating System) 1091, an application program 1092, a program module 1093, and program data 1094. That is, a program defining the respective processing of the transfer device 10 and the servers 2A and 2B is installed as the program module 1093 in which a code capable of being performed by the computer 1000 is described. The program module 1093 is stored in, for example, the hard disk drive 1090. For example, the program module 1093 for performing the same processing as that of the functional configuration in the transfer device 10 and the servers 2A and 2B is stored in the hard disk drive 1090. Note that the hard disk drive 1090 may be replaced by a SSD (Solid State Drive).

Further, the setting data used in the processing of the embodiment described above is stored in, for example, the memory 1010 or the hard disk drive 1090 as the program data 1094. Then, the CPU 1020 reads the program module 1093 or the program data 1094 stored in the memory 1010 or the hard disk drive 1090 into the RAM 1012 and performs the same where necessary.

Note that the program module 1093 or the program data 1094 is not necessarily stored in the hard disk drive 1090 but may be stored in, for example, a detachable storage medium and read by the CPU 1020 via the disk drive 1100 or the like. Alternatively, the program module 1093 and the program data 1094 may be stored in another computer connected via a network (such as a LAN (Local Area Network) and a WAN (Wide Area Network)). Then, the program module 1093 and the program data 1094 may be read by the CPU 1020 from the other computer via the network interface 1070.

The embodiment to which the invention that has been made by the present inventor is applied is described above. However, the present invention is not limited to the descriptions and the drawings constituting a part of the disclosure of the present invention according to the present embodiment. That is, all of other embodiments, examples, operational technologies, or the like that could be made by persons skilled in the art or the like on the basis of the present embodiment falls within the range of the present invention.

REFERENCE SIGNS LIST

1 Communication system
2A, 2B Server
3A, 3B VNF (Virtual Network Function)
10 Transfer device
11 Communication unit
12 Storage unit
13 Control unit
121 Management table
131 Transfer processing unit
132 Address retrieval unit

The invention claimed is:

1. A transfer device comprising one or more processors configured to perform operations comprising:
   storing a management table having an entry including a transmission destination address, an output port, and a timer;
   receiving a packet through a reception port, wherein the packet includes a transmission source address;
   referring to the management table and retrieving an entry from the management table using the transmission source address of the packet as a key, wherein the retrieved entry includes a transmission destination address that matches the transmission source address of the received packet;
   changing the output port of the retrieved entry to the reception port of the packet;
   determining whether the timer of the retrieved entry is set;
   in response to determining that the timer is not set, setting the timer of the entry;
   in response to determining that the timer is set, keeping a content of the retrieved entry unchanged;
   receiving a to-be-transferred packet; and
   transferring the to-be-transferred packet from an output port of an entry, included in the management table, that corresponds to the to-be transferred packet.

2. A transfer method performed by a transfer device of claim 1, the transfer method comprising:
   referring to the management table and retrieving an entry from the management table using the transmission source address of the packet as a key, wherein the retrieved entry includes a transmission destination address that matches the transmission source address of the received packet;
   changing the output port of the retrieved entry to the reception port of the packet;
   determining whether the timer of the retrieved entry is set;
   in response to determining that the timer is not set, setting the timer of the entry;
   receiving a to-be-transferred packet; and
   transferring the to-be-transferred packet from an output port of an entry, included in the management table, that corresponds to the to-be transferred packet.

3. A communication system having a first physical device that operates first software at a data migration source, a second physical device that operates second software at a data migration destination, and a transfer device that transfers a packet, wherein
   the first software synchronizes data and a transfer address used by the first software with the second software,
   the second software broadcasts a packet in which an address taken over from the first software is attached as a transmission source address to a data plane network at designated timing, and
   the transfer device has one or more processors configured to perform operations comprising:
   storing a management table having an entry including a transmission destination address, an output port, and a timer;
   receiving a packet through a reception port, wherein the packet includes a transmission source address;
   referring to the management table and retrieving an entry from the management table using the transmission source address of the packet as a key, wherein the retrieved entry includes a transmission destination address that matches the transmission source address of the received packet;
   changing the output port of the retrieved entry to the reception port of the packet;
   determining whether the timer of the retrieved entry is set;
   in response to determining that the timer is not set, setting the timer of the entry;
   in response to determining that the timer is set, keeping a content of the retrieved entry unchanged;
   receiving a to-be-transferred packet; and
   transferring the to-be-transferred packet from an output port of an entry, included in the management table, that corresponds to the to-be transferred packet.

4. The communication system according to claim 3, wherein,
   when receiving a packet in which a same address as an address set in the first software is attached to a header during transmission of data to the second software, the first software stops the transmission of the data to the second software and notifies the second physical device of completion of the transmission of the data to the second physical device.

5. A non-transitory computer readable medium storing one or more instructions for causing a computer to perform:
   referring to the management table and retrieving an entry from the management table using the transmission source address of the packet as a key, wherein the retrieved entry includes a transmission destination address that matches the transmission source address of the received packet;
   changing the output port of the retrieved entry to the reception port of the packet;
   determining whether the timer of the retrieved entry is set;
   in response to determining that the timer is not set, setting the timer of the entry;
   receiving a to-be-transferred packet; and
   transferring the to-be-transferred packet from an output port of an entry, included in the management table, that corresponds to the to-be transferred packet.

* * * * *